US008166541B2

(12) United States Patent
Furuya (10) Patent No.: US 8,166,541 B2
(45) Date of Patent: Apr. 24, 2012

(54) INFORMATION PROCESSING APPARATUS AND DATA MANAGEMENT SYSTEM

(75) Inventor: Tomoyuki Furuya, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 1021 days.

(21) Appl. No.: 11/345,275

(22) Filed: Feb. 2, 2006

(65) Prior Publication Data

US 2006/0190989 A1 Aug. 24, 2006

(30) Foreign Application Priority Data

Feb. 18, 2005 (JP) ................................. 2005-042984

(51) Int. Cl.
*G06F 21/00* (2006.01)
(52) U.S. Cl. .......................................... 726/21; 726/27
(58) Field of Classification Search ...................... 726/22
See application file for complete search history.

(56) References Cited

U.S. PATENT DOCUMENTS

| | | | | |
|---|---|---|---|---|
| 5,708,709 A * | 1/1998 | Rose | ............................... | 705/59 |
| 5,933,498 A * | 8/1999 | Schneck et al. | ................ | 705/54 |
| 6,185,684 B1 * | 2/2001 | Pravetz et al. | ................ | 713/182 |
| 6,308,273 B1 * | 10/2001 | Goertzel et al. | ................... | 726/9 |
| 6,505,300 B2 * | 1/2003 | Chan et al. | ...................... | 713/164 |
| 6,567,107 B1 * | 5/2003 | Stannard | ........................ | 715/764 |
| 6,889,210 B1 | 5/2005 | Vainstein | | |
| 6,889,325 B1 * | 5/2005 | Sipman et al. | ................. | 713/176 |
| 7,072,962 B2 * | 7/2006 | Hori | ............................. | 709/224 |
| 7,178,033 B1 | 2/2007 | Garcia | | |
| 7,218,924 B2 * | 5/2007 | McArdle | ....................... | 455/418 |
| 7,260,555 B2 | 8/2007 | Rossmann et al. | | |
| 7,380,120 B1 | 5/2008 | Garcia | | |
| 7,478,418 B2 | 1/2009 | Supramaniam et al. | | |
| 7,533,420 B2 * | 5/2009 | Battagin et al. | .................. | 726/26 |
| 7,562,232 B2 | 7/2009 | Zuili et al. | | |
| 7,565,683 B1 | 7/2009 | Huang et al. | | |
| 7,631,184 B2 | 12/2009 | Ryan | | |
| 7,681,034 B1 | 3/2010 | Lee et al. | | |
| 7,729,995 B1 | 6/2010 | Alain et al. | | |
| 2001/0027457 A1 * | 10/2001 | Yee | .............................. | 707/203 |
| 2003/0108883 A1 | 6/2003 | Rondinone et al. | | |
| 2003/0110169 A1 | 6/2003 | Zuili et al. | | |
| 2003/0120601 A1 | 6/2003 | Ouye et al. | | |
| 2003/0154381 A1 * | 8/2003 | Ouye et al. | ..................... | 713/182 |

(Continued)

FOREIGN PATENT DOCUMENTS

CN 1382028 A 12/2002

(Continued)

*Primary Examiner* — Gilberto Barron, Jr.
*Assistant Examiner* — David Le
(74) *Attorney, Agent, or Firm* — Fitzpatrick, Cella, Harper & Scinto (57) ABSTRACT

It is an object to provide an information processing apparatus and a data management system which can access data and maintain security even in an environment where the apparatus cannot be connected to a security managing server. To accomplish the object, a secure application discriminates whether or not authentication can be obtained from the managing server. If it is decided that the authentication cannot be obtained from the managing server, a process of secure data is executed in accordance with use restriction information of the data. If it is decided that the authentication can be obtained from the managing server, a process of the data is executed in accordance with access right information from the managing server.

6 Claims, 8 Drawing Sheets

U.S. PATENT DOCUMENTS

| | | |
|---|---|---|
| 2004/0103202 A1 | 5/2004 | Hildebrand et al. |
| 2004/0133444 A1* | 7/2004 | Defaix et al. ................... 705/1 |
| 2005/0010780 A1* | 1/2005 | Kane et al. ................... 713/182 |
| 2005/0289197 A1* | 12/2005 | Kan et al. ................... 707/204 |
| 2006/0059348 A1* | 3/2006 | Girard et al. ................... 713/176 |
| 2008/0034205 A1 | 2/2008 | Alain et al. |
| 2009/0100268 A1 | 4/2009 | Garcia et al. |
| 2009/0254972 A1 | 10/2009 | Huang et al. |

FOREIGN PATENT DOCUMENTS

| | | |
|---|---|---|
| EP | 1223742 A1 | 7/2002 |
| EP | 1320014 | 6/2003 |
| JP | 11-261550 | 9/1999 |
| JP | 2003-228520 | 8/2003 |
| JP | 2004-151163 | 5/2004 |
| JP | 2004-280227 | 10/2004 |

* cited by examiner

INFORMATION PROCESSING APPARATUS AND DATA MANAGEMENT SYSTEM

BACKGROUND OF THE INVENTION

1. Field of the Invention

The invention relates to a data management system constructed by a plurality of information processing apparatuses connected to a network and a security managing server for making security management to data which is used by the information processing apparatuses.

2. Related Background Art

In recent years, electronic documents are handled in various PCs (personal computers) and input/output apparatuses (printing apparatus, multi-function apparatus, and the like) through a network, the number of opportunities in which secret information flows outside, such as printing or distribution by a printer, storage into a personal PC, storage or taking-out into/from a USB storage, and the like is increasing, and further, it is also difficult to specify an outflow path. Therefore, importance is attached to security for preventing an information leakage and various measures for assuring the security are taken.

As such measures, for example, there are: a measure in which the electronic document itself is encrypted and only the user having an access right is enabled to access it; a measure in which transmission data of the network is encrypted and the transmitter and the receiver use a decoding key in common; a measure in which the access of the printing apparatus itself is managed by a user ID or a password and the data is printed only when authentication is obtained; and the like.

However, there is such a problem that the above measures relate to the security for a local process and even if various measures are combined, a load of an access right setting person increases. In dependence on a combination of the above measures, there is such a problem that a security hole due to a setting leakage occurs. Further, it is difficult to prevent the information leakage which is caused when the access right setting person takes out the electronic document or the like.

Therefore, an attention is paid to the measure called a secure document system in which the PCs and input/output (I/O) apparatuses connected to the network and the electronic documents which are handled in the PCs and I/O apparatuses are unitarily managed by a security managing server. As such a secure document system, for example, there has been disclosed a system which has a security managing server for making access right management to an encrypted electronic document and in which a PC or an input/output apparatus connected to a network has to obtain authentication from the security managing server in order to access the encrypted electronic document (for example, refer to Japanese Patent Application Laid-Open No. 2004-280227).

Therefore, the PC or the I/O apparatus needs to be connected to the security managing server in order to access the encrypted electronic document. Even if the electronic document is taken out of the network, since no authentication is obtained, the access cannot be performed at all, and all of access situations and access histories of the PCs, applications, and I/O apparatuses which access the electronic document can be unitarily managed.

However, to access the encrypted electronic document as characteristics of the secure document system disclosed in Japanese Patent Application Laid-Open No. 2004-280227, the apparatus needs to be connected to the security managing server. There is, consequently, such a problem that it is impossible to satisfy such a request that the user wants to access the encrypted electronic document even in an environment such as meeting in a meeting room or destination of a business trip where the apparatus cannot be connected to the security managing server.

SUMMARY OF THE INVENTION

The invention is made in consideration of the foregoing circumstances and it is an object of the invention to provide an information processing apparatus and a data management system in which even in an environment where the apparatus cannot be connected to a security managing server, it can access secure data (encrypted electronic document) and maintain security.

The invention is made to solve the above problems and according to the invention, there is provided an information processing apparatus comprising:

a discrimination unit adapted to discriminate whether or not authentication can be obtained from a managing server; and a processing unit adapted to execute a process of data in accordance with use restriction information of the data if it is determined by the discrimination unit that the authentication cannot be obtained from the managing server and execute the process of the data in accordance with access right information from the managing server if it is determined by the discrimination unit that the authentication can be obtained from the managing server.

According to the invention, there is provided an information processing apparatus comprising:

a discrimination unit adapted to discriminate whether or not authentication can be obtained from a managing server; and a processing unit adapted to change a temporary data portion of data if it is determined by the discrimination unit that the authentication cannot be obtained from the managing server and change a real data portion of the data on the basis of the temporary data portion of the data if it is determined by the discrimination unit that the authentication can be obtained from the managing server.

DETAILED DESCRIPTION OF THE PREFERRED EMBODIMENTS

Embodiments of the invention will be described in detail hereinbelow with reference to the drawings.

First Embodiment

First, a document management system (data management system) constructed by a host apparatus (information processing apparatus) and a security managing server will be described as a first embodiment of the invention. The document management system in the embodiment constructs a secure document system.

Figure 1:
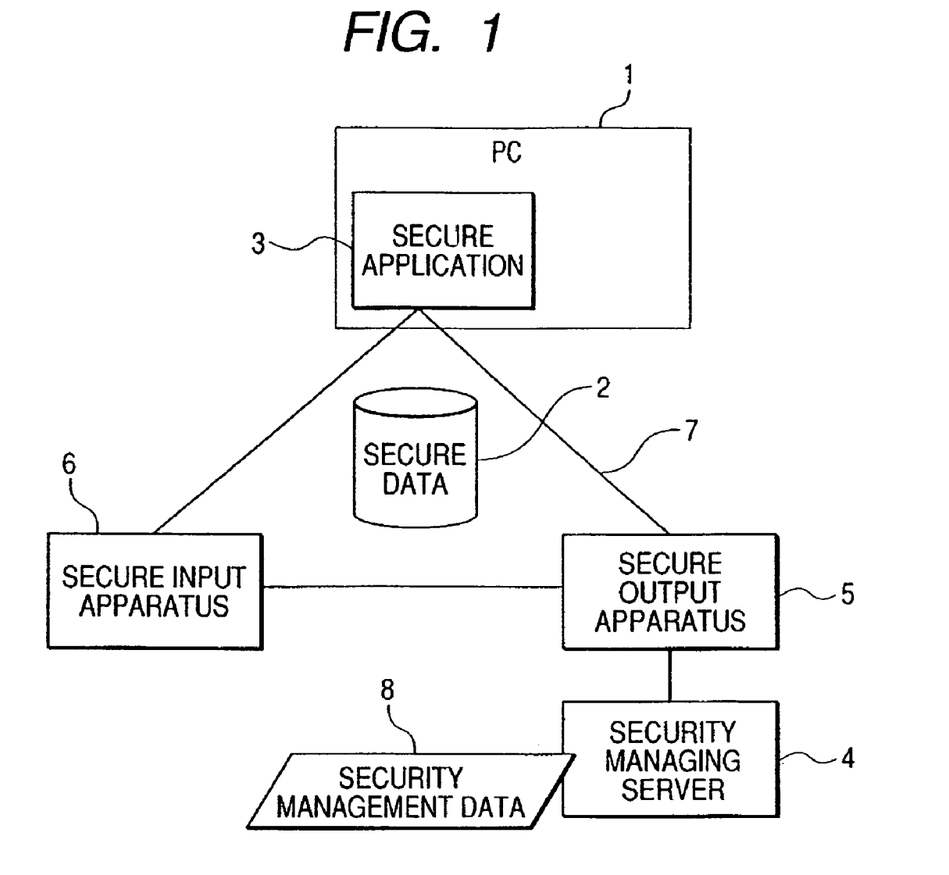
FIG. 1 is a diagram showing a schematic construction of a document management system in the first embodiment of the invention.

FIG. 1 is a diagram showing a schematic construction of the document management system in the first embodiment of the invention. The document management system shown in FIG. 1 is constructed by: a secure output apparatus 5; a host apparatus 1 in which a secure application 3 has been installed; a secure input apparatus 6; and a security managing server 4 connected to the secure output apparatus 5. The host apparatus 1, secure output apparatus 5, and secure input apparatus 6 are connected to a network 7 and can access secure data 2. The secure data 2 is, for example, document data which has been encrypted and whose access is permitted only to the specific users. In the embodiment, it is assumed that a plurality of secure data 2 can be referred to on the network 7.

Although the security managing server 4 is directly connected to the secure output apparatus 5 in FIG. 1, the invention is not limited to such a construction. The security managing server 4 can be connected to the network 7, secure input apparatus 6, or host apparatus 1. Although the host apparatus 1, secure output apparatus 5, and secure input apparatus 6 are connected to the network 7 in FIG. 1, the invention is not limited to such a construction. Any one of the host apparatus 1, secure output apparatus 5, and secure input apparatus 6 can be connected to the network 7. In this case, it is not always necessary that the secure application 3 has been installed in the host apparatus 1 but can be also installed in the secure output apparatus 5 or the secure input apparatus 6.

Each of the host apparatus 1, secure output apparatus 5, and secure input apparatus 6 in which the secure application 3 has been installed has a function in which it can access the secure data 2 as encrypted document data on the basis of authentication information from the security managing server 4. Security management data 8 has been stored in the security managing server 4. Authentication or the like of an access right when authentication is issued is made with reference to the security management data 8.

Figure 2:
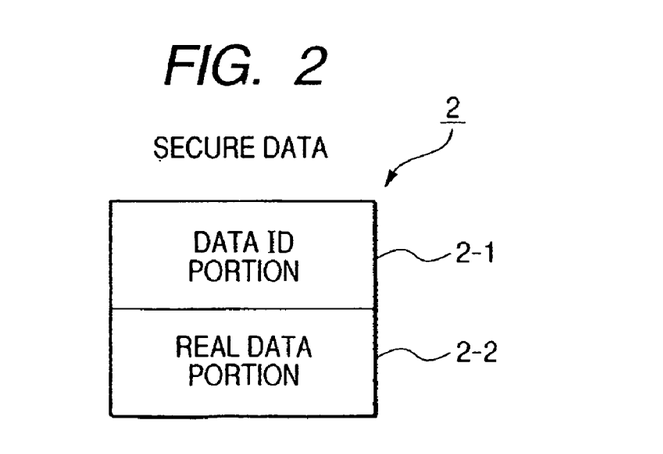
FIG. 2 is a diagram showing an example of an internal structure of secure data 2 in the document management system in the embodiment.

FIG. 2 is a diagram showing an example of an internal structure of the secure data 2 in the document management system in the embodiment. As shown in FIG. 2, the secure data 2 has been encrypted and has at least two kinds of areas of a data ID portion 2-1 and a real data portion 2-2. As for the data ID portion 2-1, the data ID portion 2-1 is allocated on the basis of a unit which is managed by the security managing server 4 and it is not always necessary that the data ID portion 2-1 corresponds to a file name of the secure data 2 in a one-to-one relational manner. Even if the file names are the same, different data IDs can be allocated. Although a document, an image, a video image, or the like can be mentioned as a real data portion 2-2, since the secure data 2 itself has been encrypted, it is impossible to access (or decrypt or reproduce) the real data portion 2-2 by an apparatus or application other than the secure application 3 (host apparatus 1), secure output apparatus 5, secure input apparatus 6, and security managing server 4.

Figure 3:
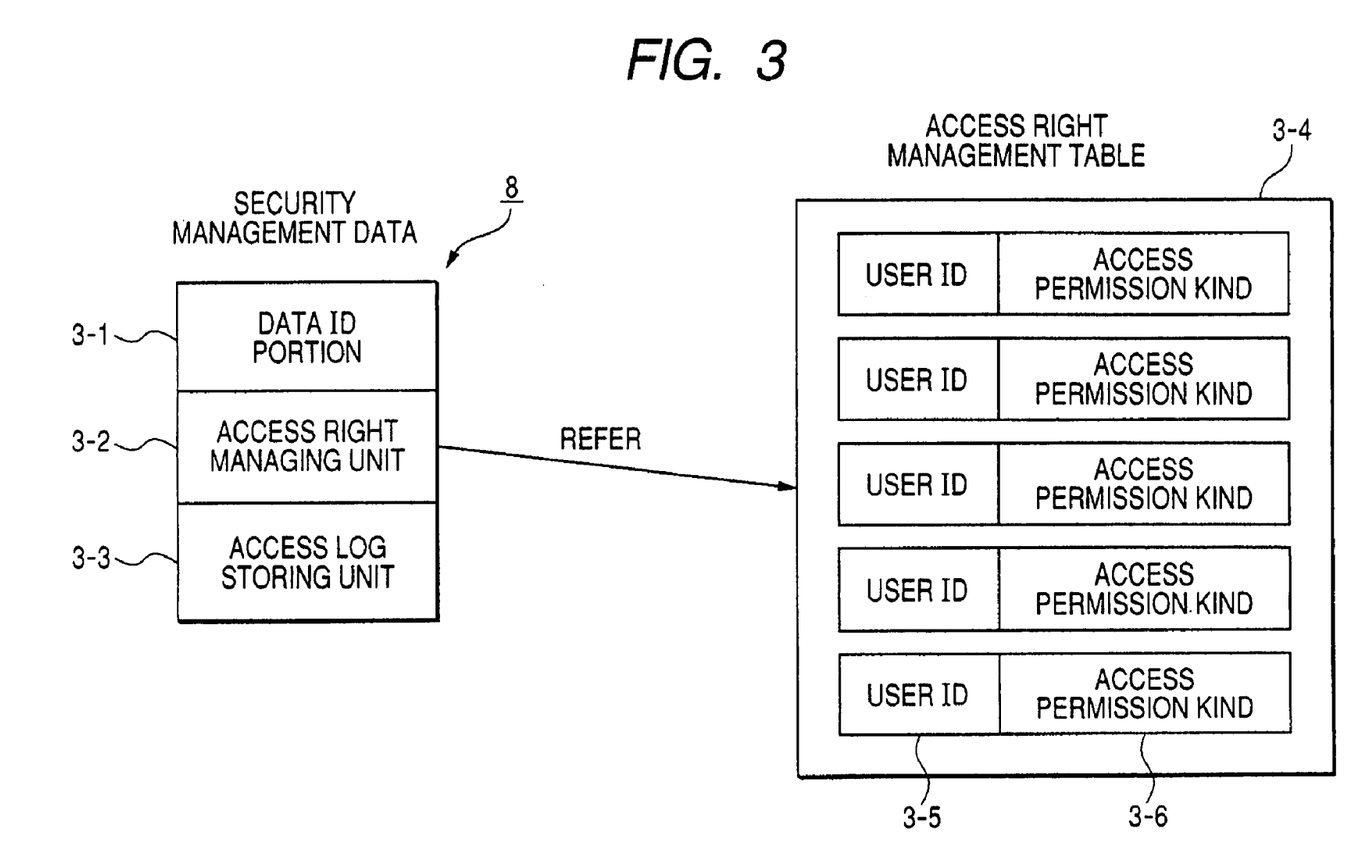
FIG. 3 is a diagram showing an example of security management data 8 stored in a security managing server 4 in the document management system in the embodiment.

FIG. 3 is a diagram showing an example of the security management data 8 stored in the security managing server 4 in the document management system in the embodiment. The security management data 8 corresponding to the secure data 2 in a one-to-one relational manner has been stored in the security managing server 4. As shown in FIG. 3, the security management data 8 fundamentally has three kinds of areas of a data ID portion 3-1, an access right managing unit 3-2, and an access log storing unit 3-3. In the embodiment, the security management data 8 of the number as many as the number of all secure data 2 which exist in the document management system and to which the data IDs have been allocated exist.

The data ID portion 3-1 corresponds to the data ID portion 2-1 of the secure data 2. The access right managing unit 3-2 stores information for managing the access right to the secure data 2. The access log storing unit 3-3 stores access situations, as logs, of the secure application 3, secure output apparatus 5, and secure input apparatus 6 to the secure data 2.

As shown in FIG. 3, ordinarily, an access right management table 3-4 set by an administrator or the like has been linked to the access right managing unit 3-2. An access permission kind 3-6 of each user ID 3-5 has been registered in the access right management table 3-4. The security managing server 4 determines the access right on the basis of information in the access right management table 3-4 linked to the access right managing unit 3-2. The access permission kind 3-6 is information regarding processing contents which can be executed by (or permitted to) the user who is specified by the user ID. Specifically speaking, it is information regarding whether or not each user is enabled to execute a process such as edition, copy, display, or printing of the secure data 2.

Figure 4:
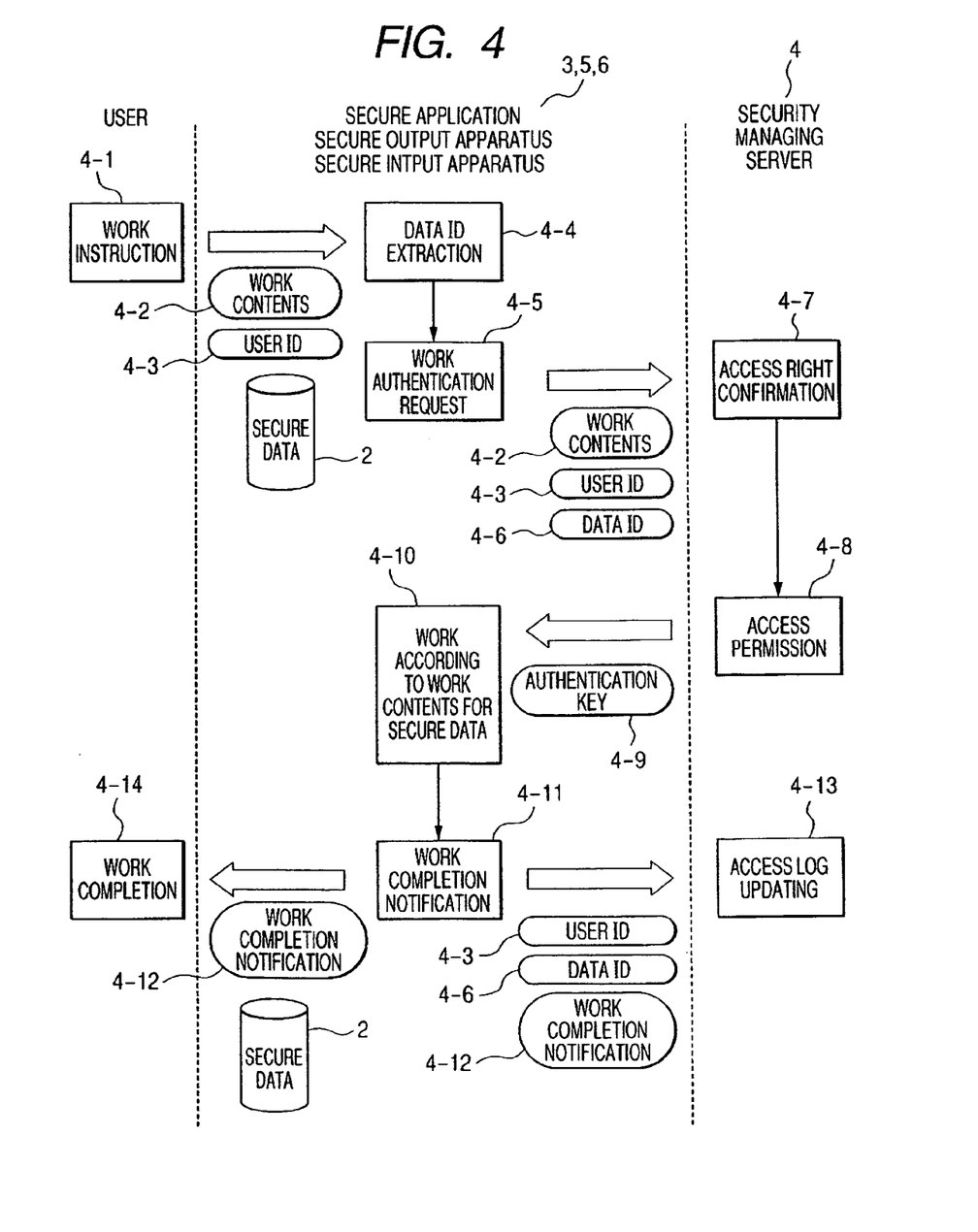
FIG. 4 is a diagram showing an outline of an authenticating process which is executed in a document management system in the embodiment.

FIG. 4 is a diagram showing an outline of an authenticating process which is executed between the security managing server 4 and each of the secure application 3, secure output apparatus 5, and secure input apparatus 6 in the document management system in the embodiment.

In FIG. 4, if the user wants to executes work such as edition, printing, or the like to the encrypted secure data 2, he inputs a work instruction 4-1 for the work to be executed to the secure application 3, secure output apparatus 5, or secure input apparatus 6. Specifically speaking, as a work instruction 4-1, information regarding work contents 4-2 and the secure data 2 are instructed and a user ID 4-3 to specify the user is also designated. In the following description, processes of the secure application 3 will be described on the assumption that the user of the host apparatus 1 having the secure application 3 has inputted the work instruction 4-1. Naturally, as shown in FIG. 4, similar processes can be also executed by the secure output apparatus 5 or the secure input apparatus 6.

Subsequently, when the secure application 3 receives the user ID 4-3, the information (referred to as first information) to specify the secure data 2, and the work contents 4-2 by the input of the user, it extracts the data ID from the data ID portion 2-1 of the secure data 2 specified by the first information (4-4). Subsequently, the secure application 3 requests the security managing server 4 to authenticate the work (4-5). At this time, the secure application 3 sends the work contents 4-2, the user ID 4-3, and a data ID 4-6 extracted by the process (4-4) to the security managing server 4.

The security managing server 4 confirms the access right from those information and the access right managing unit 3-2 of the security management data 8 (4-7). If the access right for the work contents 4-2 is proper, the server 4 permits the access (4-8) and issues an authentication key 4-9 to the secure application 3.

The secure application 3 which obtained the authentication by receiving the authentication key 4-9 executes the work corresponding to the work contents 4-2 for the secure data (4-10) and notifies that the work has been completed (4-11). The work completion notification is a process which is executed to both of the user and the security managing server 4. The secure application 3 transmits the user ID 4-3, data ID 4-6, and a work completion notification 4-12 to the security managing server 4. Thus, the security managing server 4 updates the access log in the access log storing unit 3-3 of the security management data 8 (4-13). The secure application 3 notifies the user of the information of the work completion notification 4-12 and issues the secure data 2 subjected to the work, thereby completing the work instructed by the user (4-14).

The secure data 2 obtained by embedding a temporary access right (use restriction information) serving as a feature of the embodiment into the secure data 2 shown in FIG. 2 will now be described. In the embodiment, it is assumed that the user can embed the temporary access right into arbitrary secure data 2 among a plurality of secure data 2 existing on the network 7.

Figure 5:
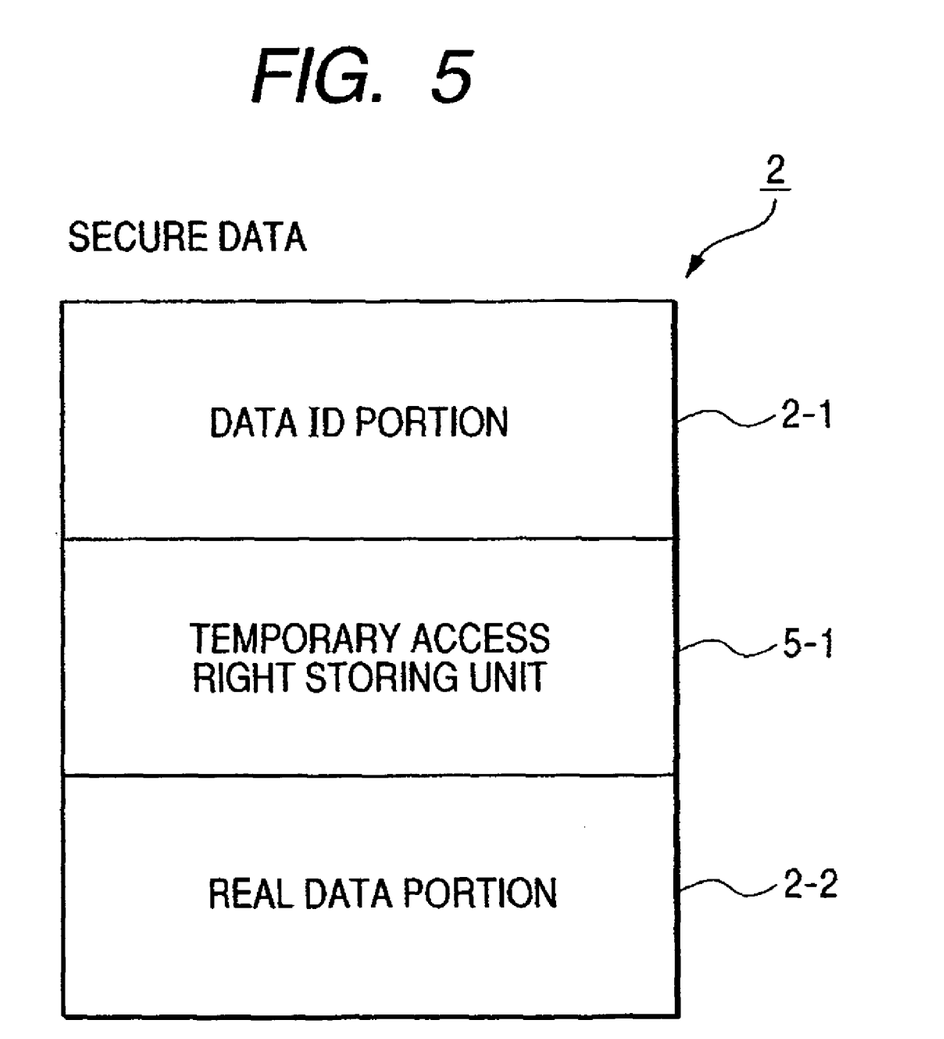
FIG. 5 is a diagram showing an example of the internal structure of the secure data 2 in the document management system in the embodiment.

FIG. 5 is a diagram showing an example of the internal structure of the secure data 2 in the document management system in the embodiment. The data ID portion 2-1 and the real data portion 2-2 constructing the secure data 2 in FIG. 5 are similar to those shown in FIG. 2. As compared with FIG. 2, the secure data 2 in FIG. 5 is characterized in that a temporary access right storing unit 5-1 exists. Information which is stored in the temporary access right storing unit 5-1 is similar to that of the user ID 3-5 and the access permission kind 3-6 in the access right management table 3-4 in FIG. 3 and is information showing which process can be executed for the secure data 2 every user.

The information (hereinafter, referred to as a temporary access right) which is stored in the temporary access right storing unit 5-1 is obtained when the secure application 3, secure output apparatus 5, or secure input apparatus 6 requests it from the security managing server 4. The temporary access right is stored into the secure data 2. The security managing server 4 forms the temporary access right on the basis of the information in the access right management table 3-4 and issues it. Fundamentally, the temporary access right is information obtained by adding restriction information to the access permission kind 3-6. The restriction information is information defining time/date when the temporary access right is valid, the number of times in which it is possible to access the secure data 2, inhibition of the edition, inhibition of the printing, and the like. That is, the temporary access right can be also regarded as a finite access right.

The temporary access right is necessary to enable the secure data 2 to be processed in the situation where the secure application 3, secure output apparatus 5, and secure input apparatus 6 cannot obtain the authentication from the security managing server 4 (for example, situation where the communication cannot be made). That is, in the situation where the authentication can be obtained from the security managing server 4, the secure application 3 obtains the temporary access right from the security managing server 4 and stores the temporary access right into the temporary access right storing unit 5-1 of the secure data 2. Thus, even in the environment where the apparatus cannot be connected to the security managing server 4 and the authentication cannot be obtained (environment where the apparatus cannot be connected to the network since the user is in a meeting room or destination of a business trip), it is possible to access the secure data 2 by satisfying conditions of the temporary access right in the temporary access right storing unit 5-1 included in the secure data 2.

It is not always necessary that the temporary access right includes the information regarding the access permission kinds for all of the user IDs 3-5 in the access right management table 3-4. Only the information (temporary access right) regarding the access permission kinds for the users according to the necessity can be also stored. As for timing for allowing the user to select whether or not the temporary access right is embedded in the secure data 2, for example, it is also possible to allow the user to select whether or not the temporary access right is given when the secure data 2 is edited and stored.

Figure 6:
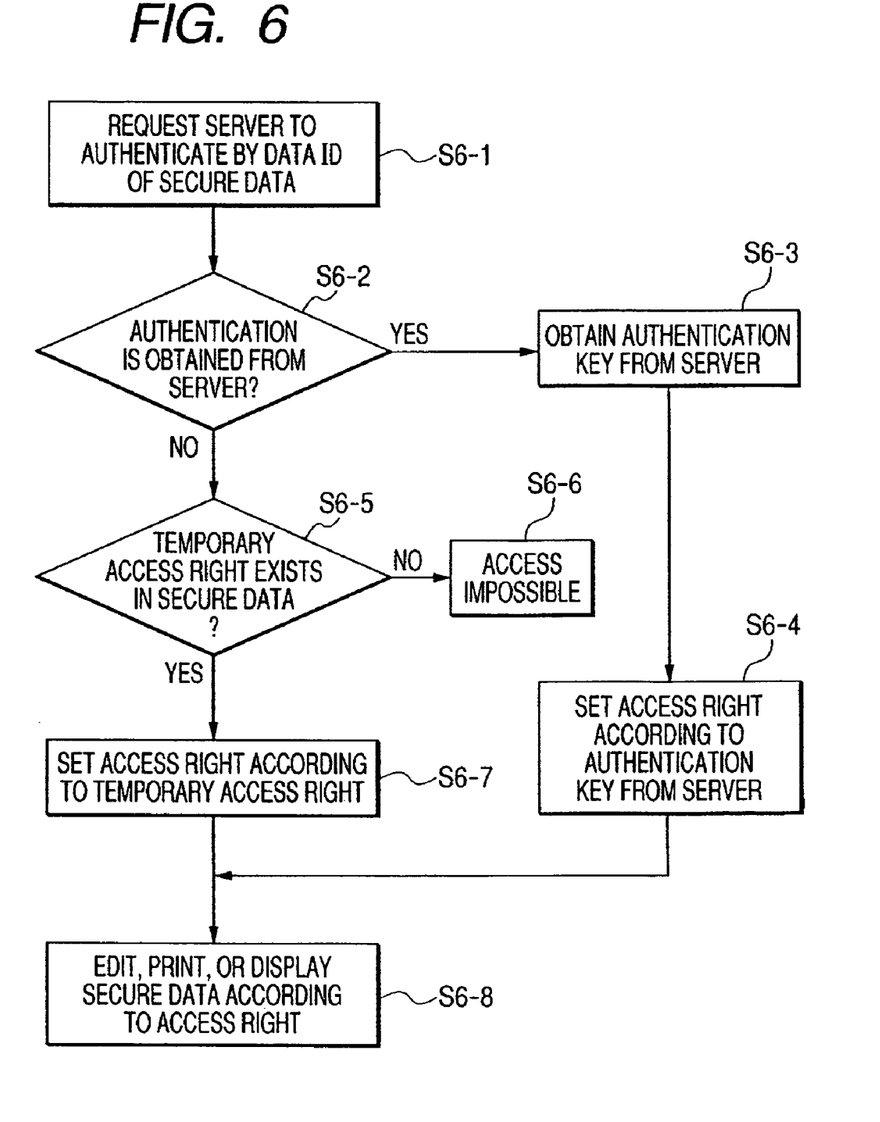
FIG. 6 is a flowchart showing a secure data process in the document management system in the embodiment.

FIG. 6 is a flowchart showing secure data processes in the document management system in the embodiment. Although the explanation will be made hereinbelow on the assumption that the secure application 3 executes the processes for the secure data 2, similar processes can be also executed in the secure output apparatus 5 and the secure input apparatus 6. Corresponding contents are disclosed in the portions corresponding to the processes (4-4) and (4-5) in FIG. 4.

As shown in FIG. 6, when the secure application 3 receives the work instruction 4-1 to the secure data 2 from the user, it extracts the data ID from the data ID portion 2-1 of the secure data 2 (4-4) and issues a work authentication request to the security managing server 4 (4-5) in step S6-1.

In next step S6-2, the secure application 3 discriminates whether or not the authentication can be obtained from the security managing server 4. The discrimination about whether or not the authentication can be obtained from the security managing server 4 is discrimination about whether or not the apparatus can communicate with the security managing server 4. If it is decided here that the authentication can be obtained, the secure application 3 obtains the authentication key from the security managing server 4 (step S6-3) and sets the access right according to this authentication key (step S6-4) in a manner similar to the processes shown in FIG. 4. Thus, the secure application 3 executes the process such as edition, printing, or display to the secure data 2 according to the work contents 4-2 in accordance with the access right in step S6-8.

If it is determined that the authentication cannot be obtained from the security managing server 4 due to some reason such as "communication impossible" or the like, the secure application 3 discriminates whether or not the temporary access right exists in the temporary access right storing unit 5-1 of the secure data 2 in step S6-5. If it is determined that the temporary access right does not exist, the secure application 3 disables the access to the secure data 2. Therefore, the user cannot execute the editing process or the like to the secure data 2. If it is determined that the temporary access right exists, the secure application 3 sets access authorization the according to the temporary access right in step S6-7. As mentioned above, in step S6-8, the secure application 3 executes the process such as edition, printing, or display to the secure data 2 according to the work contents 4-2 in accordance with the access authorization.

As mentioned above, in response to the work instruction 4-1 to the secure data 2 from the user, the secure application 3 preferentially uses the access authorization set in step S6-4 or S6-7 and executes the process according to the work contents 4-2 within the range according to the access authorization. As described above, in the document management system in the embodiment, even in the environment where the apparatus cannot be connected to the security managing server 4, it can access the secure data 2 and the security to the secure data 2 can be maintained by restricting the access by the temporary access right. Since the security managing server 4 issues the temporary access right, the unitary management to the secure data 2 by the security managing server 4 can be made.

Figure 7:
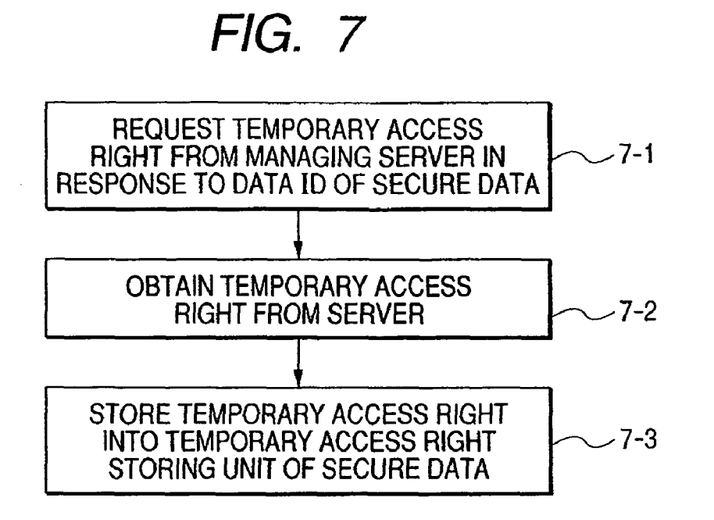
FIG. 7 is a flowchart showing processes which are executed until a temporary access right is obtained from the security managing server 4 and stored into the secure data 2 in the document management system in the embodiment.

FIG. 7 is a flowchart showing processes which are executed until the secure application 3, secure output apparatus 5, and secure input apparatus 6 in the document management system in the embodiment obtain the temporary access right from the security managing server 4 and store it into the secure data 2. Although explanation will be made hereinbelow on the assumption that the secure application 3 executes the processes to the secure data 2, similar processes can be also executed in the secure output apparatus 5 and the secure input apparatus 6.

When the secure application 3 receives a secure data forming instruction for taking out from the user, it extracts the data ID from the data ID portion 2-1 of the secure data 2 and issues a temporary access right request to the security managing server 4 (step S7-1). In this instance, it is also possible to further designate the user ID and allow only the specific users as targets to form the secure data. Thus, the security managing server 4 forms a temporary access right on the basis of the access permission kind 3-6 with reference to the security management data 8 and returns it to the secure application 3. Subsequently, the secure application 3 obtains the temporary access right from the security managing server 4 (step S7-2). Then, the secure application 3 stores the obtained temporary access right into the temporary access right storing unit 5-1 of the secure data 2. By the above processes, the secure data 2 in which the temporary access right has been stored is formed as secure data for taking out.

Second Embodiment

Although the processes to the secure data 2 can be executed by using the temporary access right even in the environment where the authentication from the security managing server 4 cannot be derived in the foregoing first embodiment, the contents processed by using the temporary access right are not reflected to the access log storing unit 3-3 of the security management data 8 in FIG. 3. In the first embodiment, the access log showing that the secure data 2 is merely taken out to the access log storing unit 3-3 and, thereafter, it has been returned merely remains. Particularly, in the case where the secure data 2 was edited by using the temporary access right, when the secure data 2 after the edition is returned to the security managing server 4 after that, its edition contents cannot be grasped. In the document management system in the second embodiment, an edition history and the like regarding the secure data 2 processed by using the temporary access right can be grasped and managed in the security managing server 4.

Figure 8:
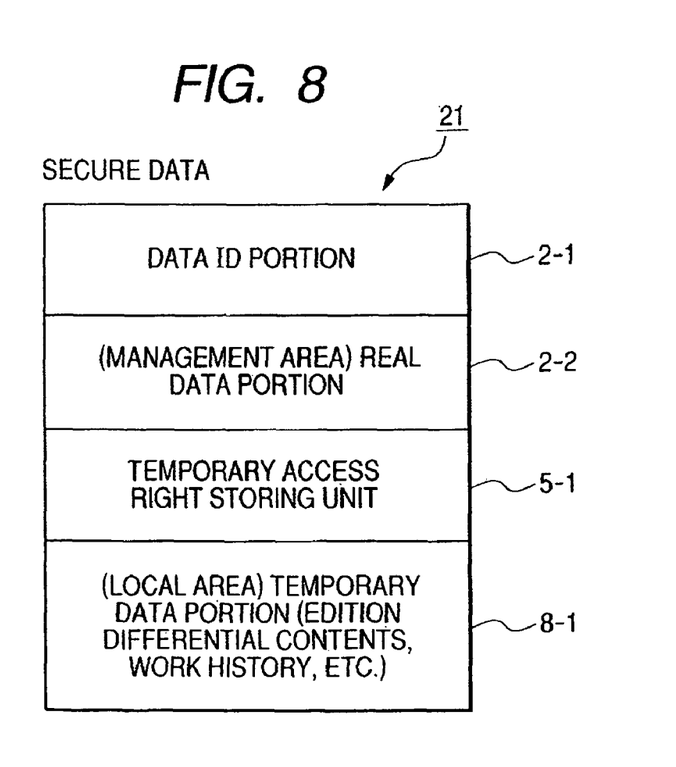
FIG. 8 is a diagram showing an example of an internal structure of secure data in a document management system in the second embodiment.

FIG. 8 shows an example of an internal structure of the secure data in the document management system in the second embodiment. Secure data 21 in FIG. 8 differs from the secure data 2 in FIG. 5 with respect to a point that a temporary data portion 8-1 is added. Other data ID portion 2-1, real data portion 2-2, and temporary access right storing unit 5-1 are similar to those in the first embodiment. For convenience of explanation, the real data portion 2-2 is assumed to be a management area and the temporary data portion 8-1 is assumed to be a local area, thereby distinguishing from each other. The management area is an area where the edition to the secure data 21 is executed in the situation where the secure application 3, secure output apparatus 5, and secure input apparatus 6 are connected to the security managing server 4 and the authentication is obtained. The local area is an area in which in the case where the data has been edited by using the temporary access right, differential contents of the edition are stored or, in the case where the printing process or the like has been executed by using the temporary access right, its work history is stored.

In the case where the secure application 3, secure output apparatus 5, and secure input apparatus 6 execute the processes to the secure data 21 by using the temporary access right, the data obtained by reflecting the edition differential contents of the temporary data portion 8-1 to the data in the real data portion 2-2 is handled as data. In the case where the editing work or some work has been executed, its differential contents or work history are stored into the temporary data portion 8-1. In the case where the edition is further executed to the secure data 21 in which the edition differential contents already exist by using the temporary access right, the edition differential contents which already exist may be also changed.

Figure 9:
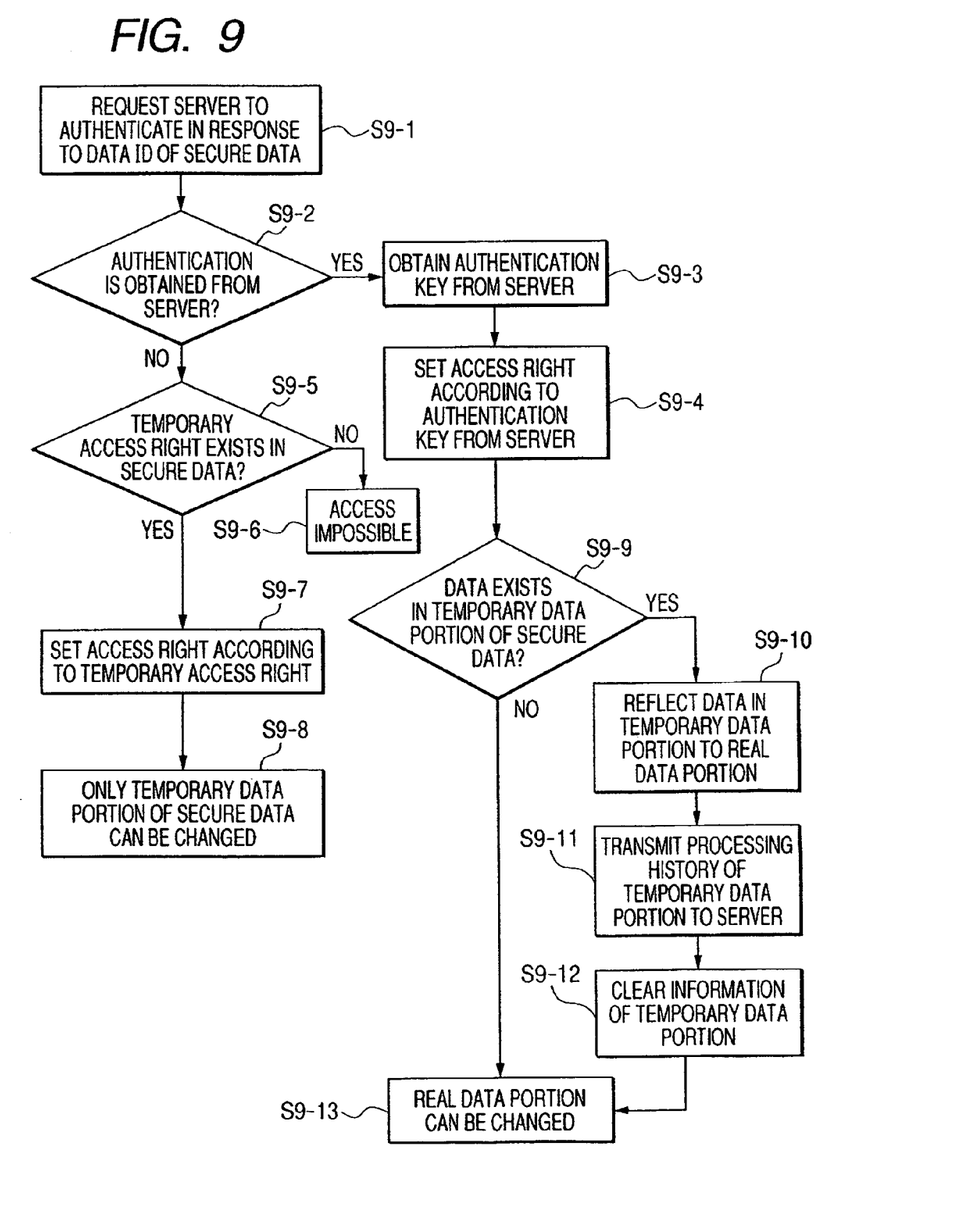
FIG. 9 is a flowchart showing a secure data process in the document management system in the second embodiment.

FIG. 9 is a flowchart showing a secure data process in the document management system in the second embodiment. Since processes in steps S9-1 to S9-7 in FIG. 9 are similar to those in steps S6-1 to S6-7 shown in FIG. 6 in the first embodiment, their explanation is omitted here. Although explanation will be made hereinbelow on the assumption that the secure application 3 executes the processes for the secure data 21, similar processes can be also executed in the secure output apparatus 5 and the secure input apparatus 6.

As a next process of step S9-7, in step S9-8, when the secure application 3 executes the processes in accordance with the temporary access right, upon edition, the edition differential contents for the data of the real data portion 2-2 are stored into the temporary data portion 8-1 of the secure data 21 and, further, a processing history of the executed processes is stored into the temporary data portion 8-1.

As a next process after the access authorization according to the authentication key obtained from the security managing server 4 was set in step S9-4, the secure application 3 discriminates whether or not the data such as edition differential contents or processing history already exists in the temporary data portion 8-1 of the secure data 21 (step S9-9). If it is decided here that the data does not exist, the secure application 3 advances to step S9-13 and executes the processes to the secure data 21. If it is decided here that the data exists, the secure application 3 advances to step S9-10 and executes the process to reflect the edition differential contents in the temporary data portion 8-1 to the data in the real data portion 2-2. In next step S9-11, the secure application 3 transmits the processing history to the security managing server 4. Subsequently, in step S9-12, the secure application 3 clears (deletes) the information in the temporary data portion 8-1. The processing routine advances to step S9-13 and the secure application 3 executes the processes to the secure data 21.

As described above, according to the document management system in the embodiment, since the processes to the secure data 21 can be executed by previously obtaining the temporary access right even in the environment where the apparatus cannot be connected to the security managing server 4, use efficiency is improved. By obtaining the temporary access right from the security managing server 4, the unitary security management including the environment where the apparatus is not connected to the network can be maintained. Further, by adding some restrictions (restriction of a period during which the access can be made, the number of access-possible times, and the like) to the temporary access right, or the like, security performance is raised and leakage of information can be prevented.

Figure 10:
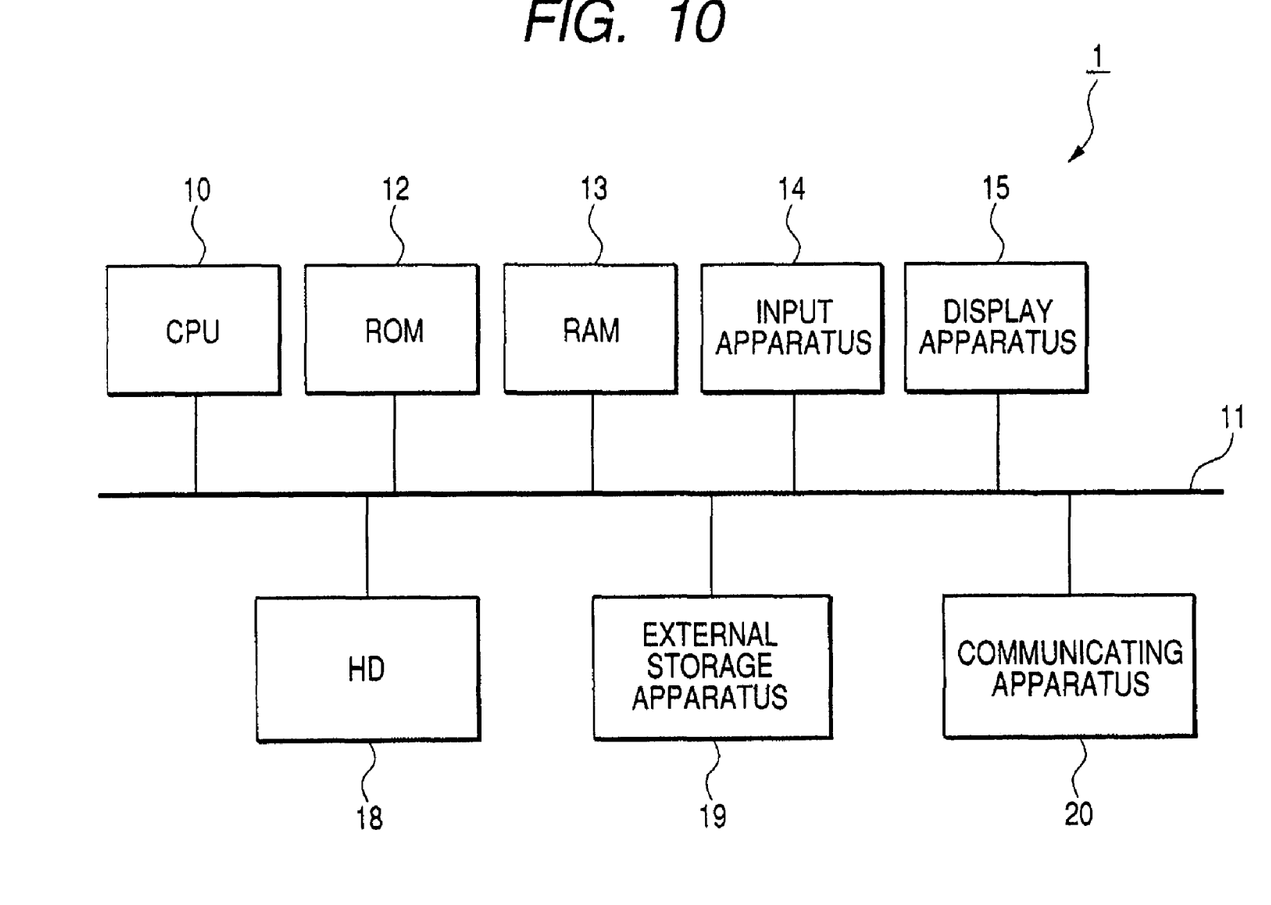
FIG. 10 is a block diagram showing an example of a hardware construction of a host apparatus (information processing apparatus) 1 shown in FIG. 1.

The functions of the processes in FIG. 9 which are executed by the secure application 3, secure output apparatus 5, and secure input apparatus 6 shown in FIG. 1 in the embodiment mentioned above are realized by a method whereby a CPU (central processing unit) reads out programs to realize the functions of the processes from a memory and executes them. FIG. 10 is a block diagram showing an example of a hardware construction of the host apparatus (information processing apparatus) 1 shown in FIG. 1. As shown in FIG. 10, the host apparatus 1 is constructed by: a CPU 10; a ROM 12; a RAM 13; an input apparatus 14; a display apparatus 15; a hard disk (HD) 18; an external storage apparatus 19; and a communicating apparatus 20.

The hardware construction of the secure output apparatus 5 and secure input apparatus 6 is similar to that of the host apparatus 1 shown in FIG. 10 except for a different point that the secure output apparatus 5 further has hardware (printer) for executing, for example, a printing process and the secure input apparatus 6 further has hardware (scanner) for executing, for example, a scanning process. The printer is an apparatus to execute the printing process to document data or image data. The scanner is an apparatus to execute a process for reading a paper document as an original and converting it into digital image data, or the like.

In FIG. 10, the CPU 10 is, for example, a microprocessor which executes an arithmetic operation, logical judgment, and the like for an image process, a character process, and a searching process by reading and executing various programs and controls, through a bus 11, component elements connected to the bus 11. The bus 11 transfers an address signal to instruct each component element as a control target of the CPU 10 and a control signal. The bus 11 also transfers data among the component elements.

The RAM 13 is a random access memory which can be read and written by the CPU 10 and is a memory which is used as a primary storage of various kinds of data from the component elements. The ROM (Read Only Memory) 12 is a read only non-volatile memory. The ROM 12 stores, for example, a boot program which is executed by the CPU 10 upon activation. Specifically speaking, when the CPU 10 executes the boot program upon activation of the system, it loads a control program stored in the hard disk 18, a program for the secure application 3, and the like into the RAM 13 and executes them.

The input apparatus 14 is constructed by a keyboard, a mouse, or the like. The display apparatus 15 is, for example, a liquid crystal display, a CRT, or the like. The hard disk 18 is a recording medium to store the program or the like which is executed by the CPU 10. The external storage apparatus 19 has an interface to a recording medium such as USB (Universal Serial Bus) memory device, IC card, or the like which is detachable to/from the host apparatus 1. The external storage apparatus 19 is not limited to the above construction but may have a construction having a drive or the like which is equipped with, for example, a flexible disk or a disk-shaped recording medium such as CD, DVD, or the like and used to access. The communicating apparatus 20 is a network controller, is connected to the network 7, and communicates with the outside through the network 7.

The CPU 10 can use the external storage apparatus 19 in a manner similar to the HD 18. As a use example of the external recording medium, a case of the IC card and a case of the USB storage will now be described. For example, in the case where user information as information to specify the user has been stored in the IC card, when the secure application 3 of the host apparatus 1 requests the temporary access right from the security managing server 4, the user information is referred to from the IC card by the external storage apparatus 19 and transferred to the security managing server 4. Thus, the security managing server 4 forms a temporary access right which can be used only by the users specified by the user information and outputs it. Consequently, the security of the secure data 2 can be improved. Similar processes can be also executed even if the temporary access right is stored into the USB storage in place of the IC card.

The invention is not limited to the above construction but all or a part of the functions of the processes in FIG. 9 which are executed by the secure application 3, secure output apparatus 5, and secure input apparatus 6 shown in FIG. 1 may be also realized by dedicated hardware. The foregoing memory can be constructed by a magnetooptic disk apparatus, a non-volatile memory such as a flash memory or the like, a read only recording medium such as a CD-ROM or the like, a volatile memory other than the RAM, or a computer-readable/writable recording medium by a combination of those devices.

The processes can be also executed by a method whereby programs to realize the functions of the processes in FIG. 9 which are executed by the secure application 3, secure output apparatus 5, and secure input apparatus 6 shown in FIG. 1 are recorded into a computer-readable recording medium and the programs recorded in the recording medium are read out and executed by a computer system. It is assumed that the "computer system" used here incorporates an OS or hardware such as peripheral devices or the like. Specifically speaking, the invention incorporates a case where the programs read out of a storage medium are written into a memory provided for a function expanding board inserted in a computer or a function expanding unit connected to the computer, after that, a CPU or the like provided for the function expanding board or the function expanding unit executes a part or all of actual processes on the basis of instructions of the programs, and the functions of the embodiments mentioned above are realized by those processes.

The "computer-readable recording medium" denotes a portable medium such as flexible disk, magnetooptic disk, ROM, CD-ROM, or the like or a storage apparatus such as hard disk built in the computer system. Further, it is assumed that the "computer-readable recording medium" also incorporates a medium which holds the programs for a predetermined time such as a volatile memory (RAM) in the computer system serving as a server or a client in the case where the programs have been transmitted through a network such as Internet or a communication line such as a telephone line.

The programs can be transmitted from the computer system having a storage apparatus or the like in which the programs have been stored to another computer system through a transmitting medium or by a transmission wave in the transmitting medium. The "transmitting medium" to transmit the programs here denotes a medium having the function for transmitting the information, such as network (communication network) such as Internet or communication path (communication line) such as telephone line.

The programs may be also programs to realize a part of the foregoing functions. Further, the programs may be also programs which can realize the foregoing functions by a combination with the programs which have already been recorded in the computer system, that is, what is called a differential file (differential program).

A program product such as a computer-readable recording medium or the like in which the programs have been recorded can be also applied as an embodiment of the invention. The programs, recording media, transmitting media, and program product mentioned above are incorporated in the purview of the invention.

Although the embodiments of the invention have been described in detail above with reference to the drawings, the specific construction is not limited to those embodiments but designs and the like within the scope which is not departed from the spirit of the invention are also incorporated.

As described above, according to the embodiments of the invention, even in the environment where the apparatus cannot be connected to the security managing server, the information processing apparatus and the data management system according to the invention can access the secure data (encrypted electronic document) and maintain concealment (security) of the secure data.

This application claims priority from Japanese Patent Application No. 2005-047984 filed Feb. 18, 2005, which is hereby incorporated by reference herein.

What is claimed is:

1. An information processing apparatus comprising:
a discrimination unit adapted to discriminate whether work authentication for secure data can be obtained from a managing server, the secure data comprising (i) temporary access right data, including a plurality of user IDs and a plurality of access permission kinds corresponding to the respective user IDs, used when the work authentication cannot be obtained, (ii) real data, and (iii) temporary data;
a first determination unit adapted to determine whether the temporary access right data exists in the secure data, if it is discriminated by said discrimination unit that the work authentication for the secure data cannot be obtained from the managing server;
a storage unit adapted (i) to make access to the secure data impossible, if it is determined by said first determination unit that the temporary access right does not exist in the secure data, and (ii) to set an access right according to the temporary access right data and store, as the temporary data of the secure data, (a) edition differential contents for the editing and (b) a processing history for the editing performed in accordance with the set access right, if it is determined by said first determination unit that the temporary access right data exists in the secure data;
a second determination unit adapted to determine whether the temporary data exists in the secure data, if it is discriminated by said discrimination unit that the work authentication for the secure data can be obtained from the managing server; and
an editing unit adapted (i) to reflect the edition differential contents in the temporary data to the real data of the secure data, (ii) to transmit the processing history in the temporary data to the managing server, (iii) to clear the temporary data, and (iv) to edit the real data, if it is determined by said second determination unit that the temporary data exists in the secure data, and
adapted to edit the real data of the secure data, if it is determined by said second determination unit that no temporary data exists in the secure data,
wherein said information processing apparatus comprises a processor configured to function as the discrimination unit, the first determination unit, the storage unit, the second determination unit, and the editing unit.

2. An apparatus according to claim 1, wherein the temporary access right data can be obtained, by making a request to the managing server, and stored, and comprises information indicating valid time/data of the temporary access right or the number of allowable access times.

3. An information processing method comprising:
a discrimination step that discriminates whether or not work authentication for secure data can be obtained from a managing server, the secure data comprising (i) a temporary access data, including a plurality of user IDs and a plurality of access permission kinds corresponding to the respective user IDs, used when the work authentication cannot be obtained, (ii) a real data, and (iii) a temporary data;
a first determination step that determines whether the temporary access right data exists in the secure data, if it is discriminated in said discrimination step that the work authentication for the secure data cannot be obtained from the managing server;
a storage step that of (i) makes access to the secure data impossible, if it is determined in said first determination step that the temporary access right data does not exist in the secure data, and (ii) sets an access right according to the temporary access right data and stores, as the temporary data of the secure data, (a) edition differential contents for and (b) a processing history for the editing performed in accordance with the set access right, if it is determined in said first determination step that the temporary access right data exists in the secure data;
a second determination step that determines whether the temporary data exists in the secure data, if it is discriminated in said discrimination step that the work authentication for the secure data can be obtained from the managing server; and
an editing step that (i) reflects the edition differential contents in the temporary data to the real data of the secure data, (ii) transmits the processing history in the temporary data to the managing server, (iii) clears the temporary data, and (iv) edits the real data, if it is determined in said second determination step that the temporary data exists in the secure data, and
edits the real data of the secure data, if it is determined in said second determination step that no temporary data exists in the secure data.

4. A method according to claim 3, wherein the temporary access right data can be obtained, by making a request to the managing server, and stored, and comprises information indicating valid time/data of the temporary access right or the number of allowable access times.

5. A non-transitory computer-readable storage medium containing programs codes for causing an apparatus to perform a method comprising:
a discrimination step of discriminating whether or not work authentication for secure data can be obtained from a managing server, the secure data comprising (i) a temporary access data, including a plurality of user IDs and a plurality of access permission kinds corresponding to the respective user IDs, used when the work authentication cannot be obtained, (ii) a real data, and (iii) a temporary data;
a first determination step of determining whether the temporary access right data exists in the secure data, if it is discriminated in said discrimination step that the work authentication for the secure data cannot be obtained from the managing server;
a storage step of (i) making access to the secure data impossible, if it is determined in said first determination step that the temporary access right data does not exist in the secure data, and (ii) setting an access right according to the temporary access right data and storing, as the temporary data of the secure data, (a) edition differential contents for and (b) a processing history for the editing performed in accordance with the set access right, if it is determined in said first determination step that the temporary access right data exists in the secure data;

a second determination step of determining whether the temporary data exists in the secure data, if it is discriminated in said discrimination step that the work authentication for the secure data can be obtained from the managing server; and an editing step (i) of reflecting the edition differential contents in the temporary data to the real data of the secure data, (ii) to transmit the processing history in the temporary data to the managing server, (iii) to clear the temporary data, and (iv) to edit the real data, if it is determined in said second determination step that the temporary data exists in the secure data, and edit real data of the secure data, if it is determined in said second determination step that no temporary data exists in the secure data.

6. The non-transitory computer-readable storage medium according to claim 5, wherein the temporary access right data can be obtained by making a request to the managing server and stored, and comprises information indicating valid time/data of the temporary access right or the number of allowable access times.

* * * * *